H. SCHMITZ.
HORSE OVERSHOE.
APPLICATION FILED MAR. 29, 1913.
1,116,132.
Patented Nov. 3, 1914.
2 SHEETS—SHEET 1.
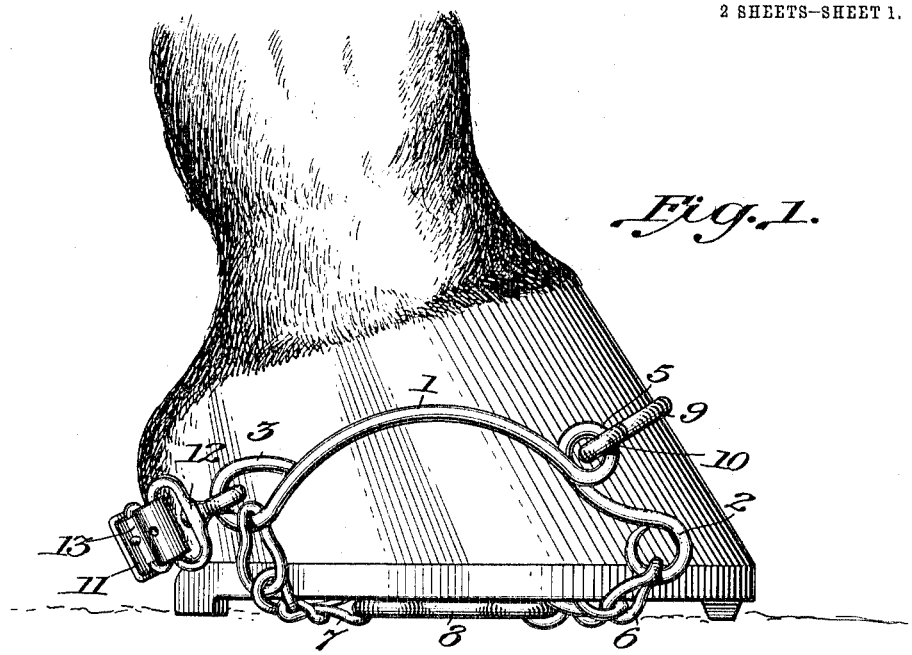
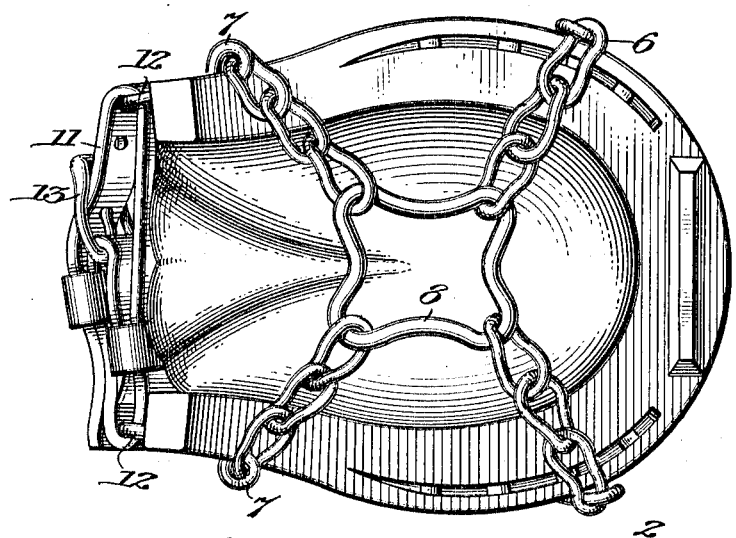

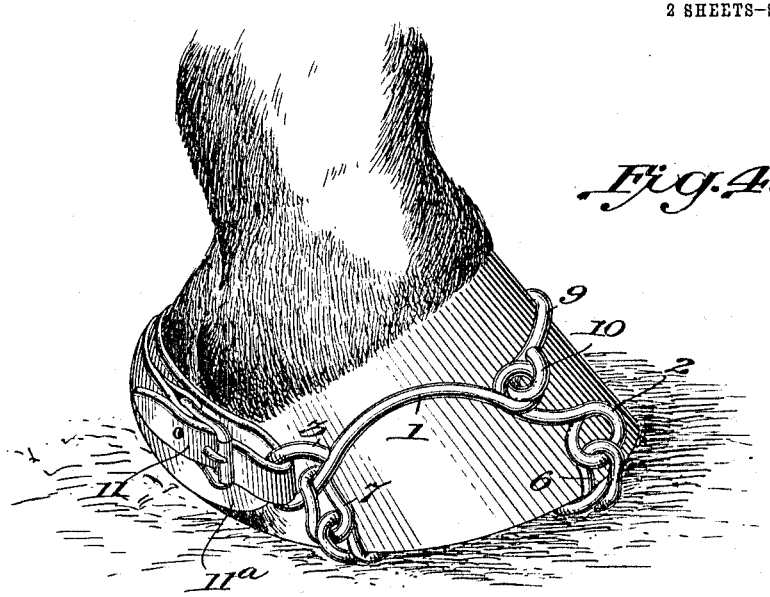
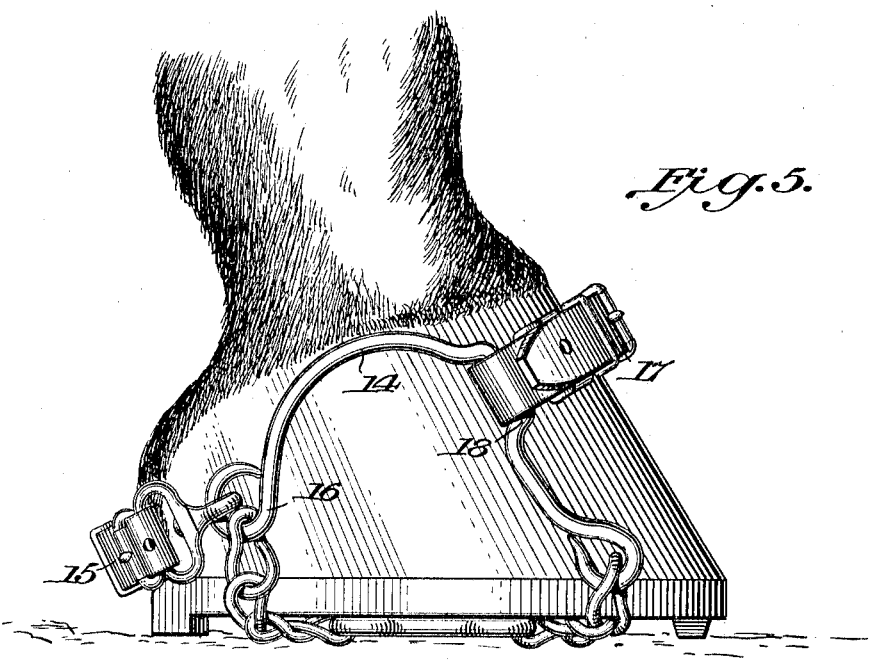

UNITED STATES PATENT OFFICE.

HERMAN SCHMITZ, OF LA FAYETTE, INDIANA.

HORSE-OVERSHOE.

1,116,132.  Specification of Letters Patent.  Patented Nov. 3, 1914.

Application filed March 29, 1913. Serial No. 757,617.

*To all whom it may concern:*

Be it known that I, HERMAN SCHMITZ, a citizen of the United States, residing at La Fayette, in county of Tippecanoe and State of Indiana, have invented certain new and useful Improvements in Horse-Overshoes, of which the following is a specification.

My invention relates to an improvement in horse over shoes.

The object is to provide a device of this character in which the creeper chain or other anti-slipping device is positioned to have a bearing against all parts of the lower side of the hoof, so that undue pressure will not be brought to bear against any one part or against the tender frog, thus causing the horse to go lame after wearing the device for any length of time.

A further object is to construct a means for holding the creeper chain in such a manner that an almost vertical up draw will be exerted to hold the chain in place.

A still further object is to provide a structure so arranged that the over shoe may be used with equally good results upon a shod or unshod horse.

This invention relates to still other novel features of construction and combinations of parts which will be hereinafter more fully described and pointed out in the claim.

In the accompanying drawings:—Figure 1 is a view in side elevation, showing the device applied to one of the hoofs of a shod animal; Fig. 2 is a bottom plan view of the hoof to better show the position of the creeper chain; Fig. 3 is a detail top plan view of one of the spreader members which hold the creeper chains in their proper working position; Fig. 4 is a perspective view to show the invention applied on an unshod animal; Fig. 5 is a view similar to Fig. 1 to show a slightly different form which the invention might take and yet accomplish the same object; and Fig. 6 is a top plan view of the spreader members used with the form disclosed in Fig. 5.

In the disclosure in Figs. 1, 2, 3, and 4, the side links or spreader members 1—1 are formed of a stiff metal bent to form an arch, and having loops 2 and 3 formed at the front and rear portions respectively. The central arched portion is looped back upon itself to form an eye 5, which extends upwardly from the arched portion, preferably slightly forward of the center. Chain sections 6—6 and 7—7 are received in the loops 2—2 and 3—3, and the free ends of the chain sections are joined by the interconnecting link 8, which, as better shown in Fig. 2, causes the links of the chain anti-slipping sections to lie flat, and places the bearing evenly over the tread of the hoof, while avoiding pressure on the frog or tender part of the hoof. The links of the chain sections 6 and 7 are so formed that when these chain sections bear against the tread of the hoof, a broad even bearing is formed, and each of the links lies flat against the hoof.

The spreader members as shown in Fig. 3 are bent so that they conform to the sides of the hoof, and the eyes 5 are preferably bent slightly inwardly. A cross bar 9, which is made arched to fit over the forward part of the hoof, has loops 10—10 thereof constructed to be received in the eyes 5 of the spreader members 1. This cross bar 9 will fit against and hold the structure as described to the hoof, and the more tightly the parts are pressed upon the hoof, the greater the holding tension against the chain sections. By constructing and arranging the parts as described, the pressure which is exerted against the chain sections is in an almost vertically upward direction, due to the forming of the eyes 5 on the upper side of the spreader members 1, and the bowing of the cross bar 9. This structure efficiently performs the function of holding the chain sections against the tread of the hoof or against the shoe, but in use the device would be displaced in a forward direction, and to hold the parts against this displacement a strap or other suitable connection 11 is provided to fit the back of the hoof and be held against accidental displacement between the shoe and the hoof.

A flexible connection is provided between the strap and the loops 3 of the spreader members by the swivel connections 12—12. The strap 11 is provided with a buckle 13, by which the device may be made to fit on slightly different sizes of hoofs. It will be understood that in applying the device the chain sections are placed against the lower side of the hoof, the cross brace is placed against the forward side with the spreader members bearing at the sides, and the strap 11 is buckled in place to hold the parts in their position.

As shown in Fig. 4, the strap 11 is made slightly broader at 11ᵃ in that portion which bears against the hoof, and it is the intention that this form shall be used on an unshod horse, the widened portion being received over the joint and holding the strap against displacement.

In Figs. 5 and 6 the spreader members 14—14 are made very similar to the spreader members 1, the exception being that they are made to bow upwardly to a greater degree, and the structure is formed in this manner for the reason that the eyes 5 are not provided. With the structure as disclosed, the inextensible cross member 15, which is shown in this instance as a strap, is connected at the rear ends of the spreader members 14—14 in the loops 16—16 to hold the spreader members in place at the rear of the hoof, and the adjusting strap 17 is received over the forward part of the hoof in the same relative position as the cross bar 9 of the structure shown in Figs. 1, 2, 3, and 4, the spreader members having the body portion thereof formed slightly forward of the center to receive and hold the strap 17 in place, and as this bent up portion 18 extends upwardly beyond the loop body portion of the spreader members 14, the drawing point is brought sufficiently high to get the same vertical upward draw on the chain sections. The cross member 15, when the device is used on an unshod animal, would be positioned in the relation shown in Fig. 4, and this cross member would be made sufficiently wide to fit over and bear against the hoof to hold the device securely.

As shown in Fig. 6, the spreader members 14 are bent to conform to the shape of the hoof at the sides thereof. It will thus be seen that I have provided an over shoe which may be applied with equally good results to a shod or an unshod animal, and in either connection the bearing on the tread will be such that the hoof will not receive undue pressure at any one point, and the horse, even though the creeper be worn for a full season, will not become lame. Further, the device is held in a very rigid manner, yet there is no bearing at any point upon the fleshy part of the foot of the animal or upon the tender parts of the hoof.

It is evident that my invention might take other forms without departing from the spirit and scope as set forth, and therefore I do not wish to be limited to the exact construction set forth, but:—

Having fully described my invention, what I claim as new and desire to secure by Letters Patent is: —

A horse overshoe comprising the following elements, to wit, an interconnecting link having a general rectangular form with the sides of the rectangle curved slightly inward, chains extending from the corners of said link in four directions, two resilient bowed spreader-members, the ends of which are connected with the outer ends of the chains and the center bend to form an arch, means extending across from one arch to the other over the hoof, and adjustable means extending from the rear end of one spreader-member to the other and around the heel, whereby to tighten the overshoe upon the foot, by applying endwise strain upon the spreader-members in opposition to the pull across the front of the hoof, thereby tightening the overshoe upon the hoof and spreading the outer ends of the chains around the shoe as far as possible.

In testimony whereof I affix my signature, in the presence of two witnesses.

HERMAN SCHMITZ.

Witnesses:
 FRANK SCHMITZ,
 FRED O. EVANS.